United States Patent
Fendick et al.

(10) Patent No.: US 6,252,857 B1
(45) Date of Patent: Jun. 26, 2001

(54) METHOD AND APPARATUS FOR PROVISIONED AND DYNAMIC QUALITY OF SERVICE IN A COMMUNICATIONS NETWORK

(75) Inventors: Kerry W. Fendick, Highlands; Vikram R. Saksena, Freehold, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/034,580

(22) Filed: Mar. 4, 1998

(51) Int. Cl.[7] .............................. H04L 12/28; H04L 12/56
(52) U.S. Cl. ........................................ 370/254; 370/408
(58) Field of Search .................................... 370/255, 351, 370/389, 399, 420, 401, 466, 469, 352, 409, 431, 443, 437, 408, 254; 709/228

(56) References Cited

U.S. PATENT DOCUMENTS

| | | | |
|---|---|---|---|
| 5,732,078 | * 3/1998 | Arango | 370/355 |
| 5,809,233 | * 2/2000 | Shur | 395/200.6 |
| 5,909,446 | * 6/1999 | Horikawa et al. | 370/469 |
| 6,009,102 | * 12/1999 | Horikawa et al. | 370/401 |
| 6,021,263 | * 2/2000 | Kujoory et al. | 395/200.62 |
| 6,069,889 | * 5/2000 | Feldman et al. | 370/351 |

* cited by examiner

Primary Examiner—Alpus H. Hsu
Assistant Examiner—Duc Ho (57) ABSTRACT

A method and apparatus for providing provisioned and dynamic QoS in a communications network. In one embodiment, provisioned QoS is provided in a network using RP by deciding to establish an SVC for a sender and receiver. An NHRP resolution reply containing QoS information is received in response to an NHRP resolution request. An appropriate SVC is then established using the QoS information. In another embodiment, dynamic QoS is provided in a network using RSVP. A first RSVP multicast connection tree a first QoS is established in response to an RSVP request. When a second RSVP request is ived, a new tree is created if the QoS in the second RSVP request is not within a threshold e from the QoS of the first tree. If the QoS in the second RSVP request is within the threshold range, a new branch is added to the first tree and no new RSVP connection tree is required.

7 Claims, 5 Drawing Sheets

PRIOR ART

METHOD AND APPARATUS FOR PROVISIONED AND DYNAMIC QUALITY OF SERVICE IN A COMMUNICATIONS NETWORK

FIELD OF THE INVENTION

The invention relates to the transfer of information in a communications network. More particularly, the invention relates to a method and apparatus for provisioned and dynamic quality of service (QoS) in a communications network.

BACKGROUND OF THE INVENTION

A communications network, such as the Internet, can transmit packets of information between interconnected communications sites. Information, such as text, music or video, at an originating site is divided into a number of small information packets which are transmitted over the network using a protocol such as Internet Protocol (IP). Each packet can travel though a number of communications sites, called a "path" or "route," before reaching the destination site. Thus, some communications sites are called "routers" because they direct a packet to the next leg, or "hop," of the route towards the destination. When all of the packets have arrived at the destination, they are reassembled to create the information, such as the text, music or video, that was originally transmitted. IP is called a "connection-less" system because each individual packet of information can take a different path to reach the destination site.

A communication that relies solely on IP can be unreliable due to packet loss, reordering and duplication. The IP delivery model is often referred to as a "best effort" system and an additional end-to-end protocol, such as Transmission Control Protocol (TCP), is required to provide reliability. TCP achieves this through mechanisms such as packet retransmission, which adds to the overall information transfer delay.

The best effort communications model is adequate for some network applications, such as File Transfer Protocol (FTP) and e-mail. For other network applications, however, such as those using multimedia information, the delay and other problems caused by the best effort model can be unsatisfactory. For these applications, a method of ensuring a certain QoS, including bandwidth, delay and packet loss guarantees, is required.

To meet this need, a dedicated-connection switching technology, called Asynchronous Transfer Mode (ATM), has been developed. ATM is a "connection" oriented system because a specific path, called a Switched Virtual Circuit (SVC), is established between an origin and a destination. Every information packet flowing from that origin to that destination travels over the same SVC. Such an arrangement allows the system to establish a specific QoS for a specific flow. This can be done, for example, by reserving resources, such as bandwidth, along the path of the SVC when the SVC is created.

Because of the differences between IP and ATM, various protocols have been developed to transmit IP traffic over an ATM network infrastructure. Two such protocols are the Next Hop Resolution Protocol (NHRP) and the Resource Reservation Setup Protocol (RSVP).

Figure 1:
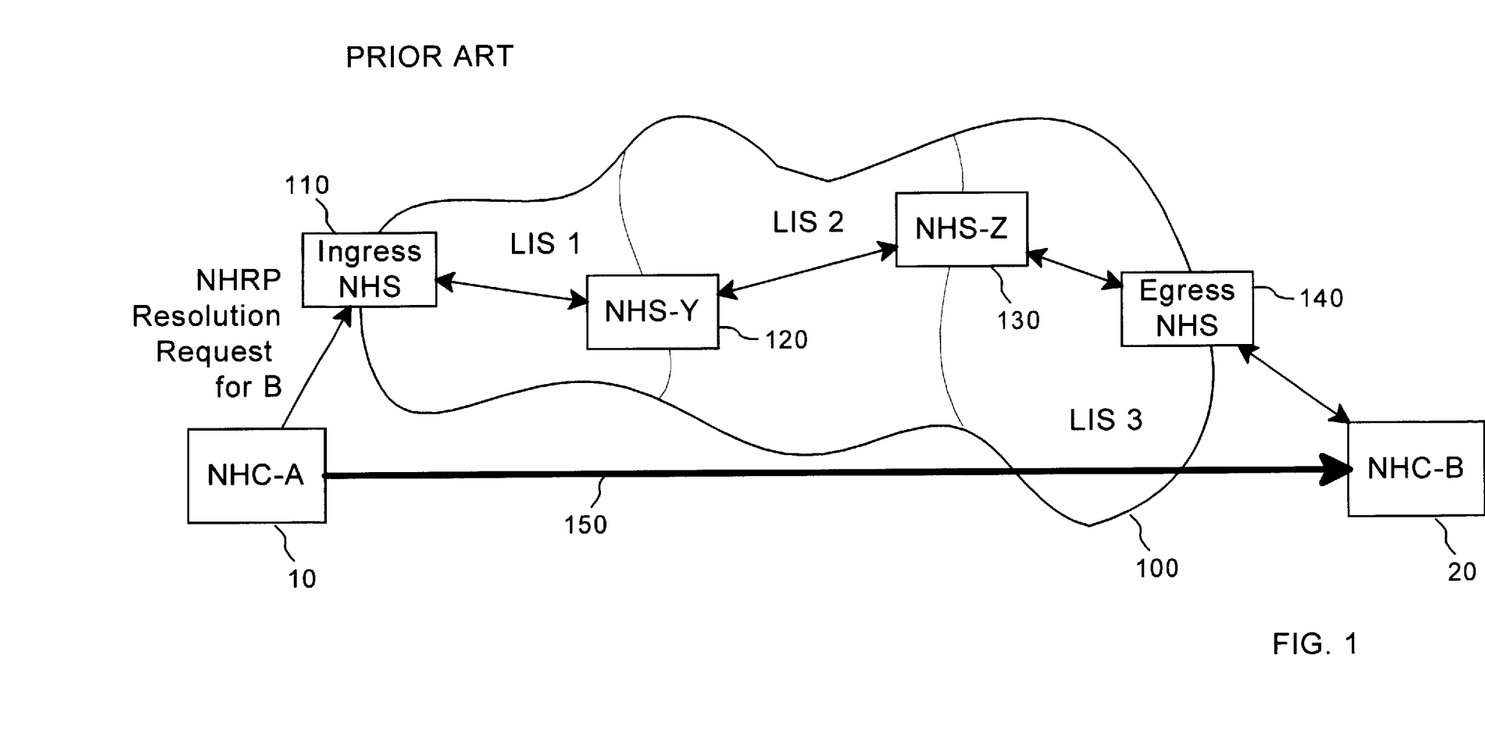
FIG. 1 is a block diagram that shows a communications network using NHRP.

As shown in FIG. 1, the NHRP system is a provisioned reservation protocol used by NHRP Servers (NHS) 110, 120, 130, 140 and NHRP Clients (NHC) 10, 20 which communicate over a network 100. The network 100 can be comprised of a number of smaller networks, called Logical IP Subnetworks (LIS), that communicate with each other using ATM. When an NHC-A 10 wants to send information to an NHC-B 20 using the IP address of the NHC-B 20, the information can be sent to an ingress NHS 110. The ingress NHS 110 can forward the information to the NHC-B 20 through an NHS-Y 120, an NHS-Z 130 and an egress NHS 140.

Obviously, this is not an optimal communication path between the NHC-A 10 and the NHC-B 20. If the NHC-A 10 could determine the ATM address of the NHC-B 20, information could be sent directly using a SVC from NHC-A 10 to NHC-B 20. NHRP allows the NHC-A 10 to send the IP address of NHC-B 20 to the ingress NHS 110 in an NHRP address "resolution request." The ingress NHS 110 maintains a table containing the IP address and ATM address of each member in its associated LIS.

If, as shown in FIG. 1, the NHC-B 20 is in a different LIS, the ingress NHS 110 will not know the ATM address of NHC-B 20. In this case, the ingress NHS 110 can forward the resolution request to the NHS-Y 120. Likewise, the NHS-Y 120 and the NHS-Z 130 can forward the request until it reaches the egress NHS 140. The egress NHS 140 can then reply with the ATM address of the NHC-B 20, back along the same path taken by the request. With this information, the NHC-A 10 can establish an end-to-end connection 150, called a "shortcut," to transfer IP packets to the NHC-B 20.

The traditional NHRP system, however, has several disadvantages. Foremost is the inability to take advantage of the QoS capabilities of ATM when transporting IP information. There is no way, for example, that a sender can know the QoS preferences or limitations of a receiver using NHRP. Moreover, when a small number of packets are being transmitted, the time and traffic required to establish the shortcut 150 can be greater than the time and traffic saved by the shortcut 150. Also, the traditional NHRP implementation does not take into account that there may be specific origins and/or destinations that will always require a shortcut with a specific QoS.

Unlike NHRP, RSVP is a generic IP network reservation protocol that allows a specific QoS to be established for an IP data flow. When an application requests a specific QoS, RSVP is used to deliver the request to each router along the path of the data stream to reserve resources along the data path. The paths used to communicate with RSVP are "dynamic" in that they can change over time. It should be noted that RSVP is not necessarily directly related to the use of ATM.

Figure 2:
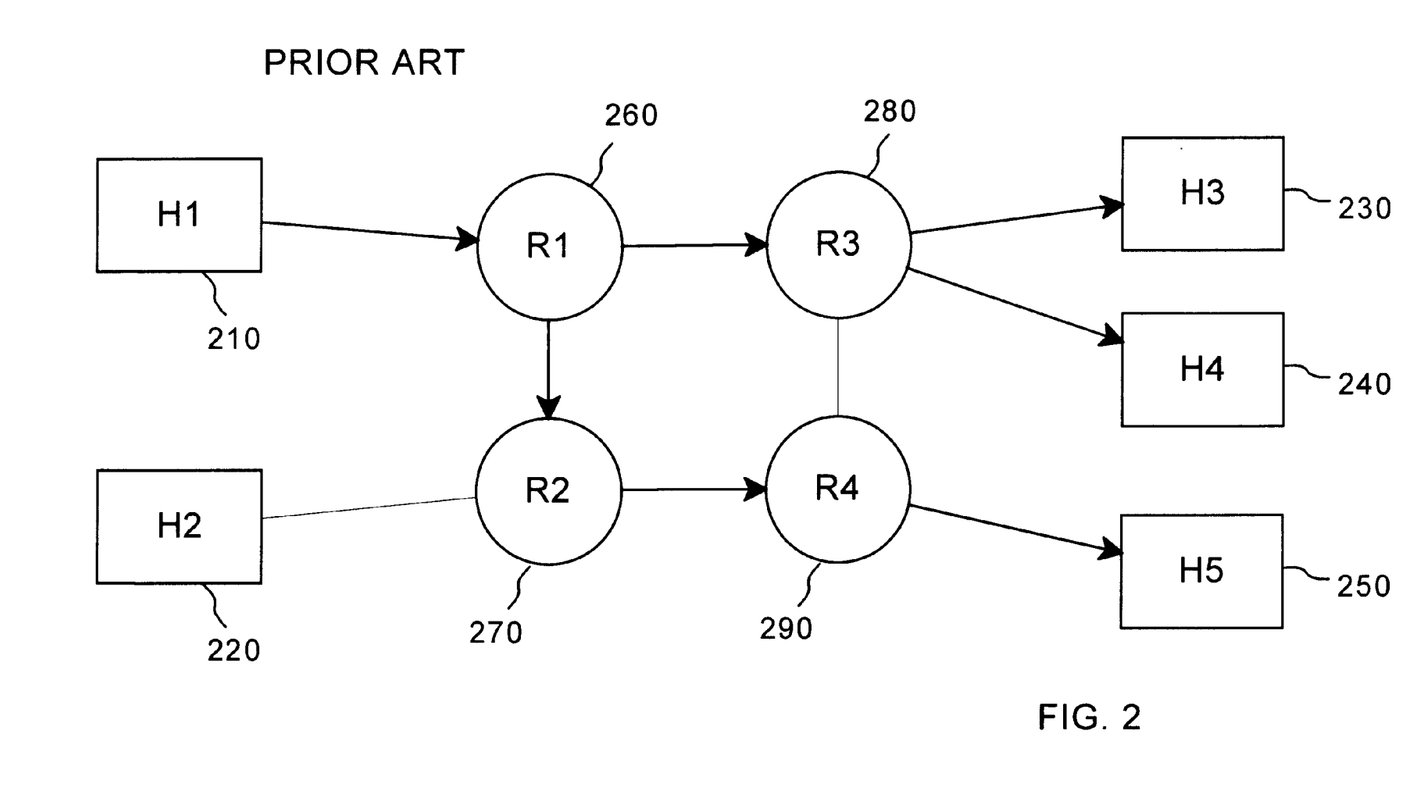
FIG. 2 is a block diagram that shows a communications network using RSVP.

RSVP also supports the simultaneous transmission of information to multiple destinations, called "multicast." As shown in FIG. 2, a sender host H1 210 can multicast information to several receiver hosts H3 230, H4 240 and H5 250 through a network of routers including R1 260, R2 270, R3 280 and R4 290. With RSVP, the receiver hosts 230, 240, 250 are responsible for requesting resource reservations. Each receiver host can request a QoS tailored to its particular need by sending RSVP reservation messages "upstream" towards the sender host 210. Just as the data branches out downstream in the routers 260, 270, 280, 290, the reservation messages going upstream are "merged". A single reservation message need only flow upstream until it is merged with another reservation message. A single host can act as both a sender and a receiver, and a different QoS might be required for each role.

When used strictly with respect to IP, an RSVP multicast tree can support a different QoS for each leaf in the tree.

However, when used to transfer information with respect to ATM, the typical point-to-multipoint tree in an ATM system can only support a single QoS. Different receiver hosts on the same multicast tree, however, might have different capabilities and therefore need different QoS. The traditional ATM implementation, therefore, requires that a separate delivery tree be created for each requested QoS. This increases the amount of traffic on the network. Alternately, the QoS of a single tree can be continuously adjusted to the level of the most demanding receiver. This will result in some receivers getting a QoS that was not requested. Such an arrangement is not desirable because a network provider may charge each receiver a different rate based on the requested QoS.

In view of the foregoing, it can be appreciated that a substantial need exists for a method and apparatus that provides provisioned QoS in a network using NHRP, and solving the other problems discussed above. Moreover, it can be appreciated that a substantial need exists for a method and apparatus that provides dynamic QoS in a network using RSVP, and solving the other problems discussed above.

SUMMARY OF THE INVENTION

The disadvantages of the art are alleviated to a great extent by a method and apparatus for providing provisioned and dynamic QoS in a communications network. In one embodiment, provisioned QoS is provided in a network using NHRP by deciding to establish an SVC for a sender and receiver. An NHRP resolution reply containing QoS information is received in response to an NHRP resolution request. An appropriate SVC is then established using the QoS information.

In another embodiment, dynamic QoS is provided in a network using RSVP. A first RSVP multicast connection tree with a first QoS is established in response to an RSVP request. When a second RSVP request is received, a new tree is created if the QoS in the second RSVP request is not within a threshold range from the QoS of the first tree. If the QoS in the second RSVP request is within the threshold range, a new branch is added to the first tree and no new RSVP connection tree is required.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention is directed to a method and apparatus for provisioned and dynamic QoS in a communications network. In particular, the following sections describe embodiments directed to: (1) provisioned QoS in a network using NHRP; and (2) dynamic QoS in a network using RSVP.

Provisioned QoS in a network using NHRP

Figure 3:
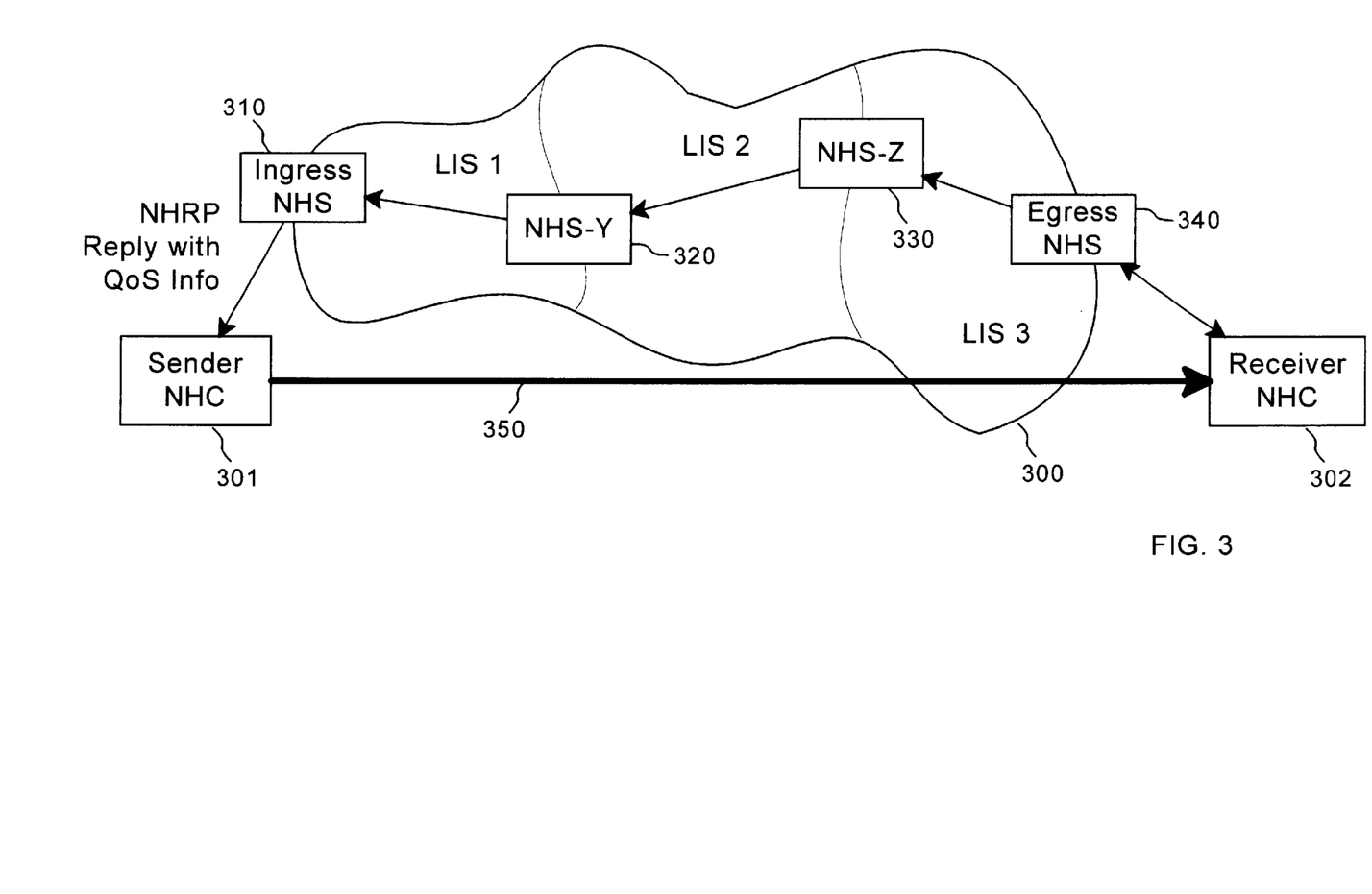
FIG. 3 is a block diagram that shows NHRP being used to provide provisioned QoS according to an embodiment of the present invention.

Referring now in detail to the drawings wherein like parts are designated by like reference numerals throughout, FIG. 3 shows an embodiment of the present invention directed to provisioned QoS in a network using NHRP. A number of NHRP Servers (NHS) 310,320,330, 340 and NHRP Clients (NHC) 301, 302 communicate over a network 300. The network 300 shown in FIG. 3 includes three Logical IP Subnetworks (LIS) that communicate with each other using ATM. As described with respect to FIG. 1, when it is decided that a shortcut 350 will be established from a sender NHC 301 to a receiver NIIC 302, the sender NHC 301 issues an NHRP address "resolution request" containing the IP address of the receiver NHC 302. The resolution request is forwarded by an ingress NHS 310, an NHS-Y 320 and an NHS-Z 330 until it reaches an egress NHS 340.

The message returned to the sender NHC 301 in response to the resolution request is called an NHRP "resolution reply" message. According to this embodiment of the present invention, the typical NHRP resolution reply message can be modified to include QoS information in addition to the ATM address of the receiver NHC 302. As explained in detail below, this QoS information can be used to create an SVC having an appropriate QoS, such as a guaranteed bandwidth.

When the egress NHS 340 receives the resolution request, it will respond with the ATM address of the receiver NHC 302. The traffic descriptor limits for the egress node can be stored in the vendor specific extension of the reply message. A vendor extension field can contain a vendor ID and opaque data, and can be attached to any NHRP request or reply. The traffic descriptor limits can include the maximum values for the following parameters: Peak Cell Rate (PCR); Sustainable Cell Rate (SCR); Minimum Cell Rate (MCR); and Maximum Burst Size (MBS).

The QoS parameters can be stored in communications switches and exchanged by the ingress switch and egress switch. This can be done using the vendor extension field of the NHRP packet. According to this embodiment of the present invention, QoS parameters are placed in the vendor extension field of an NHRP packet to be transported between the ingress and egress switch.

For example, for the parameter profile associated with each type of IP flow, the switch could support the options to assign UNI 4.0 parameters (i.e., PCR, SCR, MCR, MBS, bearer class, QoS class and HLI information) that correspond to those for: Constant Bit Rate (CBR), real-time Variable Bit Rate (VBR), non-real-time VBR, Unspecified Bit Rate (UBR) or Available Bit Rate (ABR) connections. These parameters can be specified for the direction of the data flow away from the logical port on the ingress NHS 310 and towards the egress NHS 340.

In addition to the parameter profiles associated with IP flows, an NHS could also associate the following information with logical ports: the maximum PCR, maximum SCR, maximum MCR and maximum MBS values for the data flow to and from the given logical port. A single set of maximum values could apply for the flows in either direction.

The desired minimum traffic parameters contained in the parameter profile for a given flow should be constrained not to exceed the above maximum values associated with the logical port through which the flow enters the network.

Default maximum PCR, SCR, MCR and MBS values can also be associated with each logical port. Finally, if the NHRP request came from an ATM attached end station outside the network, then minimum computed values, as well as other parameters required to establish a UNI 4.0 call, are passed along to the originating NHRP client using the vendor extension field of the NHRP response. The vendor extension field will be ignored by NHRP clients that are not capable of interpreting it.

When the sender NHC 301 receives the NHRP resolution reply, it will reconcile the desired and maximum QoS parameters and attempt to establish an appropriate SVC. Once the SVC has been established, flow abatement will be monitored in the switch. When flow abatement is detected, the SVC can be removed. The sender NHC 301 can cache the destination address and traffic descriptor limits to expedite future shortcut establishment if the flow is resumed.

When an NHRP reply is received, the sender NHC 301 can compute the minimum of: (a) the PCR maintained locally for the given direction of data flow and (b) the maximum PCR returned by the terminating NHS 340 for the same direction of data flow. Minimums for the SCR, MCR and MBS values can be similarly computed. These values, along with other desired parameters, can be used to set up the SVC shortcut 350. Since the SVC will carry traffic only in one direction, a bandwidth of zero can be specified for the reverse direction.

This embodiment of the present invention supports the ability to provision bandwidth and QoS guarantees for various types of IP flows. As used herein, an "IP flow" refers to a set of packets matching a particular profile defined in terms of source and destination IP addresses, IP protocol, source and destination port numbers, and Type of Service (ToS) requirements. Wildcards can be used for parameters to indicate "don't care" status. QoS traffic descriptors may include User Network Interface (UNI) 4.0 parameters specified in the direction of data flow from source to destination, that is from the ingress to the egress node.

The IP flow profile can also include trigger criteria defining flow onset and abatement. This could be helpful because the time and traffic required to establish the shortcut 350 can be greater than the time and traffic saved by the shortcut 350 when a small number of packets are being transmitted. Therefore, the decision to establish the shortcut 350 might only be made when the number of packets observed for the IP flow over a specified time interval exceeds a specified threshold.

Also, there may be specific origins and/or destinations that will always require a shortcut having a specific quality of service. These factors, therefore, can be considered when deciding to establish the shortcut 350 having an appropriate QoS. For example, an IP switch could attempt to map IP flows into ATM SVCs having service characteristics based on the provisioned information for the port from which the flow is first detected. The following conditions are another example of when an NHRP resolution request could be sent from a Proxy NHC residing on the ingress node: (1) an IP packet arrives on a logical port for which NHRP request initiation have been enabled; (2) the packet belongs to an IP flow with which a parameter profile has been associated; (3) a corresponding shortcut connection does not already exist; and (4) the number of SVCs on the port for that type of flow does not exceed the provisioned threshold.

This embodiment of the present invention can be implemented using an NHC or a communications switch acting as a proxy NHC. Either of these could issue the NHRP resolution request to determine a destination ATM address so that an appropriate SVC can be established for a particular IP flow profile. In addition to the ATM address, the client or proxy could receive related QoS limits and/or traffic descriptor parameters stored in the vendor extension of the reply. The client or proxy could use this information to establish QoS guarantees for the shortcut 350.

An IP switch could use Simple Network Management Protocol (SNMP) to create, delete and modify the mappings between IP flows and QoS parameters, as well as the mappings between logical ports and the maximum parameters. This could be achieved by extending the SNMP Management Information Base (MIB), and the information can be accessible by external systems, if desired.

When such an IP switch is first brought up it could initialize itself and build a table of associated default maximum PCR, SCR, MCR and MBS values with logical ports on the switch. These default values can be based on the speed of the logical port and can be provisionable via the central management interface.

It would also be possible to allow the negotiation of bandwidth parameters using UNI 4.0 signaling when the full amount of bandwidth requested is not available on the route. This could be dependent on the logical port for which the QoS parameters are maintained.

Dynamic QoS in a Network Using RSVP

Figure 4:
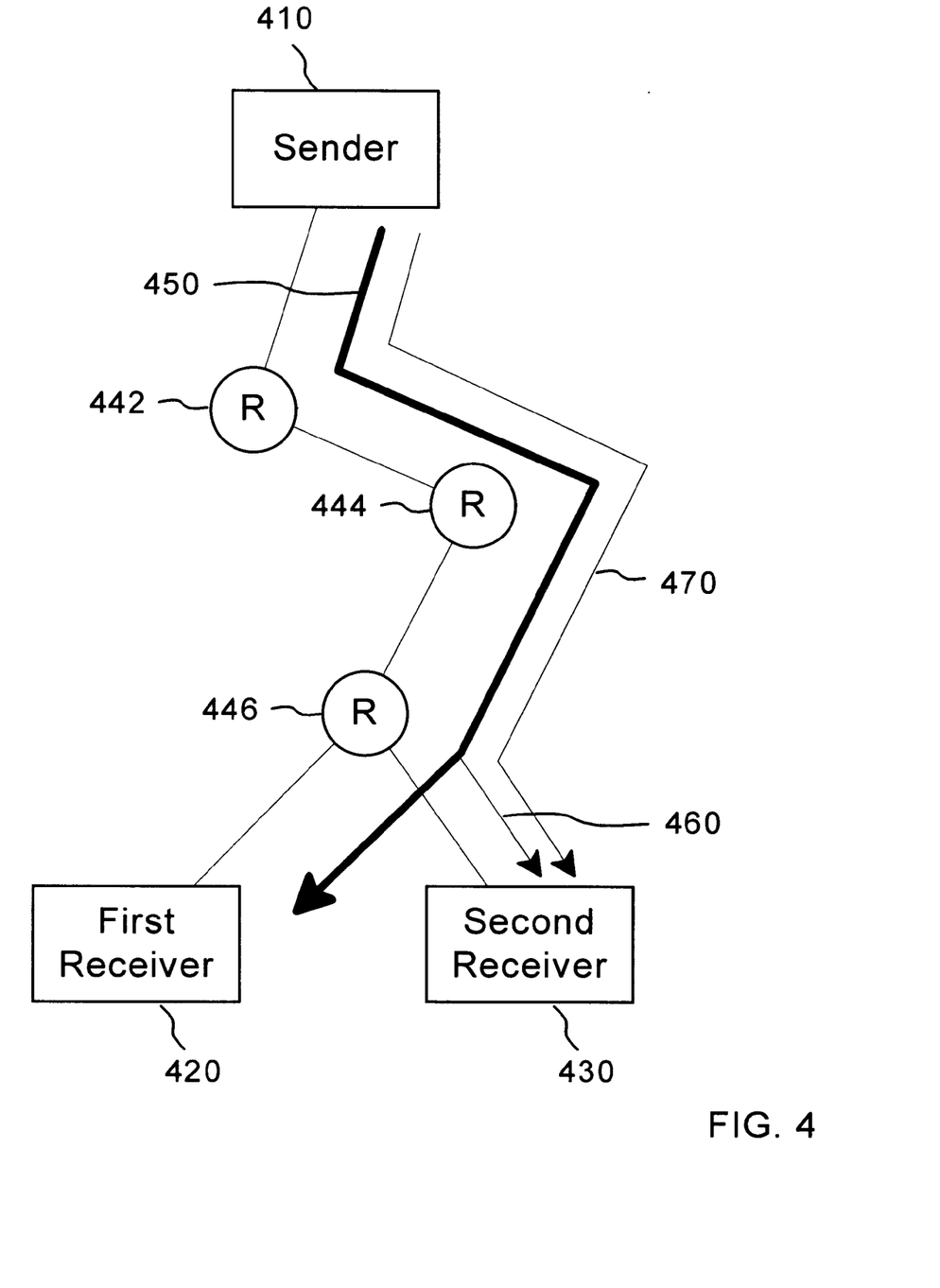
FIG. 4 is a block diagram that shows RSVP being used to provide dynamic QoS according to another embodiment of the present invention.

Another embodiment of the present invention is directed to dynamic QoS in a network using RSVP. Referring now to FIG. 4, a block diagram showing RSVP being used to provide dynamic QoS according to this embodiment, an IP flow can be established between a sender 410 and a first receiver 420. In particular, this embodiment is directed to the simultaneous transmission of information to multiple receivers, called "multicast." As can be seen in FIG. 4, a multicast flow can travel through a number of routers 442, 444, 446 in the network, and this path 450 is commonly referred to as a "delivery tree."

When the first tree 450 was created, a specific QoS was requested by the first receiver 420. Each router 442, 444, 446 in the first tree 450 reserved the resources appropriate to support the requested QoS. As previously explained, ATM allows a single tree, such as the first tree 450, to support only a single QoS for a point-to-multipoint connection.

A second receiver, however, can request the multicast information from the sender 410 with a QoS different from the QoS being provided by the first tree 450. According to the present invention, if the QoS requested by the second receiver is outside a threshold range from the QoS being provided by the first tree 450, a second delivery tree 470 is established from the sender 410 to the second receiver 430. In this case, the first tree 450 will continue to provide the QoS requested by the first receiver 420 and the second tree 470 will provide the QoS requested by the second receiver 430. This can be achieved by mapping the second request into a new ATM point-to-multipoint tree. That is, if a reservation for a different service or different parameters is requested by a receiver of a multicast flow already on an ATM point-to-multipoint connection with a single leaf, a new SVC should be established, the flow mapped into it, and the original SVC cleared.

In general, individual IP flows for which reservations are requested should be mapped into individual ATM connections, which carry traffic only in the direction for which the reservation applies, except where the merging of reservations is required by the RSVP protocol for multicast support.

In contrast, if the QoS requested by the second receiver is within the threshold range, the second delivery tree 470 is not required. Instead, a branch 460 from the first tree 450 will be extended to the second receiver 430. Thus, an IP switch according to this embodiment of the present invention would map IP flows into ATM SVCs with service characteristics based on dynamic reservations, and mapping is based on RSVP requests from the end station.

For example, the first reservation request from a receiver of a given multicast flow can be mapped into an ATM point-to-multipoint connection with a single leaf. Each subsequent request by another receiver of the same point-to-multipoint connection can be added as another leaf to an existing ATM point-to-multipoint tree for that multicast connection if (1) the requested service (controlled load or guaranteed) matches the requested service of the first leaf of that tree; and (2) the requested bandwidth is within a provisionable range, or threshold, of the requested bandwidth of the first leaf of that tree.

Assuming that there are three QoS classes, such as, for example, best effort, guaranteed service and controlled load, then by grouping receivers of the same multicast group based on the QoS class requested there will be at most three parallel virtual circuits. This would conserve network bandwidth.

In this case, if the QoS requested by the second receiver 430 is higher than the QoS being supported by the first tree 450, the first tree 450 could be upgraded to provide the higher QoS. The capability to renegotiate the bandwidth for a tree upward is desirable when the requested bandwidth is greater, but within a provisionable range of, that of the first leaf. A second virtual circuit could be created, or the first virtual circuit could be torn down and re-established with the higher QoS request.

If a third receiver (not shown in FIG. 4) later requests a QoS, that QoS can be compared to the QoS originally used to establish the multicast delivery tree. Moreover, if a reservation for a different service or different parameters is requested by a receiver of a multicast flow already on an ATM point-to-multipoint connection with more than one leaf, a new SVC should be established for that flow if the requested service does not match the original tree or the requested bandwidth is outside a provisionable range of that request for the first leaf that joined the original tree. In this way, the system can prevent a tree's QoS from drifting too far as a result of a large number of small increases in QoS.

Figure 5:
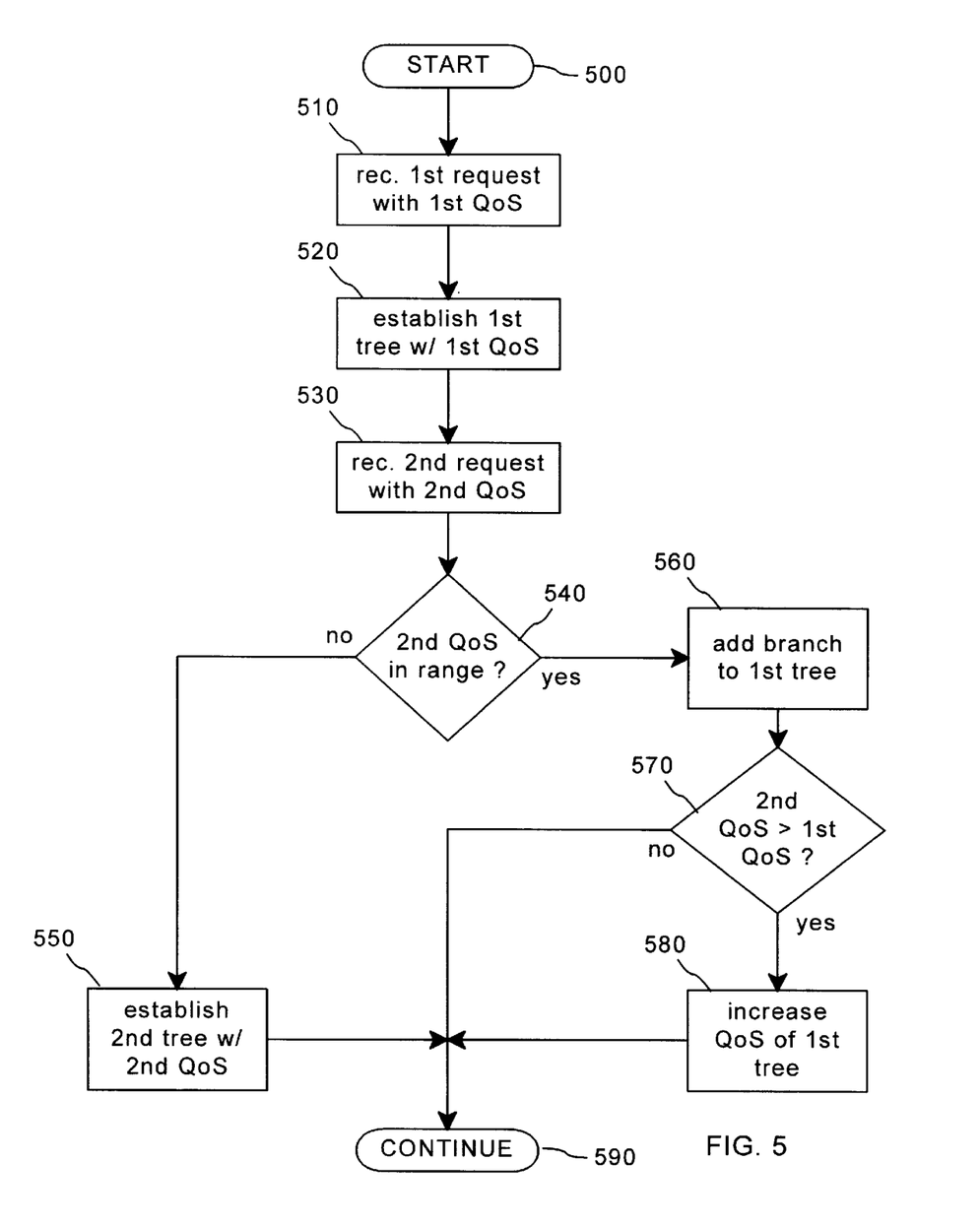
FIG. 5 is a flow diagram showing a process that can be used when providing dynamic QoS according to the embodiment shown in FIG. 4.

FIG. 5 is a flow diagram showing a process that can be used when providing dynamic QoS according to the embodiment shown in FIG. 4. After beginning at step 500, a first tree is established with a first QoS at step 520 in response to a request received at step 510. When a second request is received at 530, it is determined if the QoS in the second request is within the threshold range from the QoS of the established tree at step 520. If the QoS in the second request is not in the threshold range, a new tree is established at step 550 and the process continues at step 590.

If the QoS in the second request is within the threshold range, a branch to the existing tree is added at step 560. Moreover, if the QoS in the second request is greater than the QoS of the existing tree at step 570, the QoS of the existing tree is upgraded at step 580 before the process continues at step 590.

It is expected that the support of QoS through either NHRP or RSVP will not reduce the capacities for routing, packet forwarding and ATM SVC setups more than 5% from the corresponding capacities with QoS disabled. In general, a switch that has the QoS features enabled is expected to perform on par with a switch that is doing just route filtering.

Although various embodiments are specifically illustrated and described herein, it will be appreciated that modifications and variations of the present invention are covered by the above teachings and within the purview of the appended claims without departing from the spirit and intended scope of the invention. For example, although PCR, SCR, MCR and MBS values were illustrate one embodiment of the invention, it can be appreciated that any QoS parameters could used instead and still fall within the scope of the invention.

What is claimed is:

1. A method of providing dynamic quality of service in a communications network including a sender communications site, a first receiver communications site and a second receiver communications site, comprising the steps of:

receiving a first resource Reservation Protocol (RSVP) request for a connection from the sender communications site to the first receiver communications site, the first RSVP request including first quality of service information;

establishing a first RSVP connection tree from the sender communications site to the first receiver communications site, the first RSVP connection tree being a point to multipoint tree with a first quality of service based on the first quality of service information;

receiving a second RSVP request for a connection from the sender communications site to the second receiver communications site, the second RSVP request including second quality of service information;

establishing a second RSVP connection tree from the sender communications site to the second receiver communications site if the second quality of service information is not within a threshold range from the first quality of service information, the second RSVP connection tree being a point-to-multipoint tree with a second quality of service based on the second quality of service information; and adding a branch from the first RSVP connection tree to the second receiver communications site if the second quality of service information is within the threshold range from the first quality of service information.

2. The method of claim 1, wherein said step of adding a branch from the first RSVP connection tree further comprises the step of:

increasing the quality of service of the first RSVP connection tree if the second quality of service is higher than the first quality of service.

3. The method of claim 2, further comprising the step of:

receiving a third RSVP request for a connection from the sender communications site to a third receiver communications site, the third RSVP request including third quality of service information;

establishing a new RSVP connection tree from the sender communications site to the third receiver communications site if the third quality of service information is not within the threshold range from the first or second quality of service information, the new RSVP connection tree being a point-to-multipoint tree with a third quality of service based on the third quality of service information;

adding a new branch from the first RSVP connection tree to the third receiver communications site if the third quality of service information is within the threshold range from the first quality of service information; and adding a new branch from the second RSVP connection tree to the third receiver communications site if the third quality of service information is within the threshold range from the second quality of service information.

4. An apparatus to provide dynamic quality of service in a communications network, comprising:

means for receiving a first resource Reservation Protocol (RSVP) request for a connection from a sender communications site to a first receiver communications site, the first RSVP request including first quality of service information;

means for establishing a first RSVP connection tree from a sender communications site to the first receiver communications site, the first RSVP connection tree being a point-to-multipoint tree with a first quality of service based on the first quality of service information;

means for receiving a second RSVP request for a connection from the sender communications site to a second receiver communications site, the second RSVP request including second quality of service information;

means for establishing a second RSVP connection tree from the sender communications site to the second receiver communications site if the second quality of service information is not within a threshold range from the first quality of service information, second RSVP connection tree being a point-to-multipoint tree with a second quality of service based on the second quality of service information; and means for adding a branch from the first RSVP connection tree to the second receiver communications site if the second quality of service information is within the threshold range from the first quality of service information.

5. The apparatus of claim 4, wherein said means for adding a branch from the first RSVP connection tree further comprises:

means for increasing the quality of service of the first RSVP connection tree if the second quality of service is higher than the first quality of service.

6. The apparatus of claim 4, further comprising:

means for receiving a third RSVP request for a connection from the sender communications site to a third receiver communications site, the third RSVP request including third quality of service information;

means for establishing a new RSVP connection tree from the sender communications site to the third receiver communications site if the third quality of service information is not within the threshold range from the first quality of service information, the new RSVP connection tree being a point-to-multipoint tree with a third quality of service based on the third quality of service information;

means for adding a new branch from the first RSVP connection tree to the third receiver communications site if the third quality of service information is within the threshold range from the first quality of service information; and means for adding a new branch from the second RSVP connection tree to the third receiver communications site if the third quality of service information is within the threshold range from the second quality of service information.

7. A method of providing dynamic quality of service in a communications network including a sender communications site, a first receiver communications site and a second receiver communications site, comprising the steps of:

receiving a first resource Reservation Protocol (RSVP) request for a connection from the sender communications site to the first receiver communications site, the first RSVP request including first quality of service information;

establishing a first RSVP connection tree from the sender communications site to the first receiver communications site, the first RSVP connection tree being a point-to-multipoint tree with a first quality of service based on the first quality of service information;

receiving a second RSVP request for a connection from the sender communications site to the second receiver communications site, the second RSVP request including second quality of service information;

establishing either a second RSVP connection tree from the sender communications site to the second receiver communications site or a branch from the first RSVP connection tree to the second receiver communications site based on the first quality of service information and the second quality of service information.

* * * * *